Aug. 29, 1950  N. E. PEELER  2,520,562
LINE ADVANCER
Filed Aug. 9, 1949
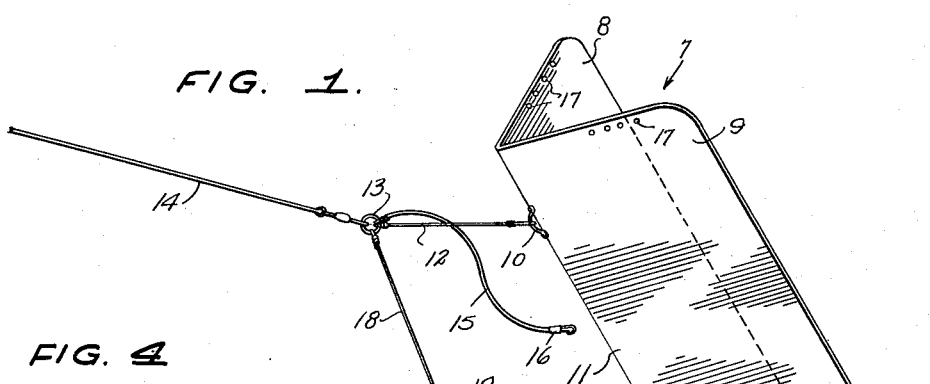
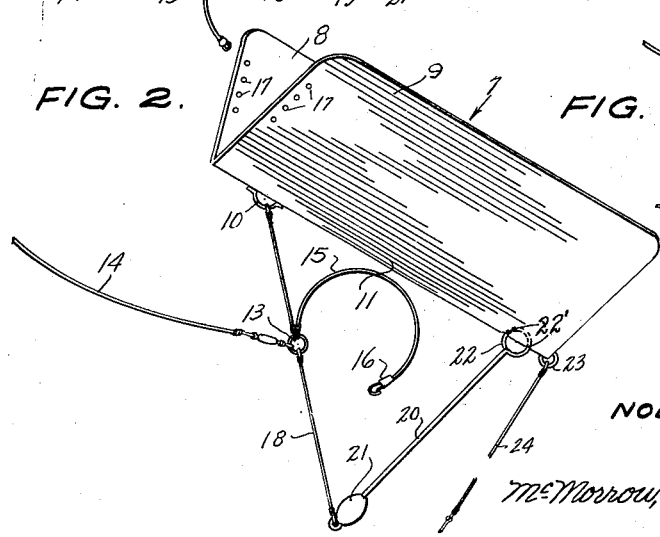
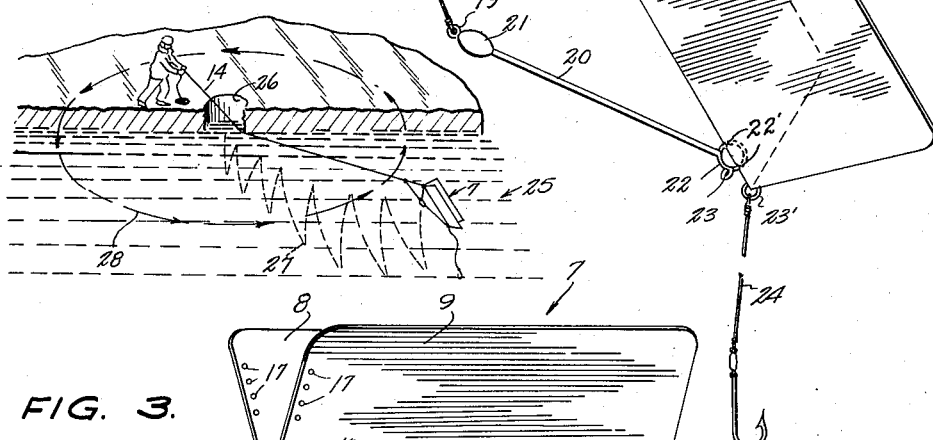
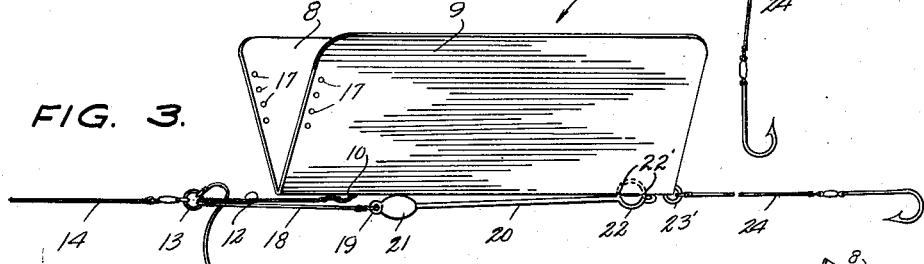
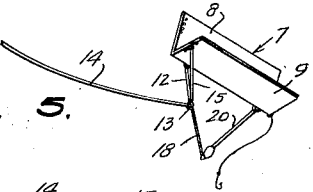
INVENTOR.
NOBLE E. PEELER,
BY
McMorrow, Berman + Davidson
ATTORNEYS.

Patented Aug. 29, 1950

2,520,562

UNITED STATES PATENT OFFICE 2,520,562

LINE ADVANCER

Noble E. Peeler, St. Paul, Minn.

Application August 9, 1949, Serial No. 109,245

5 Claims. (Cl. 43—43.13)

This invention relates to a device for advancing a line through liquid, the primary object of the invention being to provide a device of this kind which can be operated by manipulation of the line in conjunction with the force of gravity acting upon the device so as to move the device to a desired distance and direction from the station from which the line is manipulated in rectilinear and/or curvilinear paths.

Another important object of the invention is to provide a device of the above-indicated character which is susceptible of being made in a variety of forms, involving essentially two or more longitudinally-elongated surfaces connected together along a common longitudinal axis and substantially uniformly divergent from each other.

A further important object of the invention is the provision of a device of the character indicated above which is quickly and easily adjustable to travel in the liquid to one side of the line or the other without requiring a different manner of manipulation of the line.

Another important object of the invention is to provide a device of the character indicated above which can be adapted to use as a skill toy, or to military and/or industrial uses for advancing a line to enable reaching remote, underwater objects for different purposes, such as the demolition of such objects by means of an explosive charge carried by the device, where such objects are otherwise relatively inaccessible.

Other important objects and advantagous features of the invention will be apparent from the following description and accompanying drawings wherein, merely for present purposes of illustration herein, a specific embodiment of the invention is set forth in detail.

In the drawings:

Figure 1 is a side perspective view showing the advancer in pull-up position and adjusted for straight-line advancing;

Figure 2 is a similar view showing the advancer in sinking or subsiding position;

Figure 3 is a similar view showing the advancer in pull-in position;

Figure 4 is a sectional and elevational view on a reduced scale showing employment of the advancer to carry one or more fish hooks in a circle in the water beneath ice relative to a relatively small fishing hole in the ice by manipulation of a line therethrough, the dotted line showing the vertical zig-zag progression of the advancer away from the hole;

Figure 5 is a side perspective view showing the device adjusted to advance in a curvilinear path to the right and in subsiding position;

Figure 6 is a view similar to Figure 5, showing the advancer in pull-up position.

Referring in detail to the drawings, the illustrated advancer, generally designated 7, comprises two similar longitudinally-elongated, generally-rectangular planes or wings 8 and 9 joined together along longitudinal edges and diverging rearwardly from each other at an angle of about 90°, the wings being made of a sheet of aluminum, plastic, or the like, suitable material bent along the middle line. A stationary eye 10 is fixed to the under side of the leading edge 11, formed by the junction of the wings 8, near the upper or rearward end thereof and has attached thereto the forward end of a short, flexible sling 12 which is connected at its rearward end to a ring 13 to which the forward end of the line 14 to be advanced is connected. An auxiliary flexible sling 15 is connected at one end to the ring 13 and has hook means 16 on its free end for quick detachable connection with a selected one of the rows of holes 17, 17 along the rear end edges of the left and right-hand planes 8 and 9.

Also having one end connected to the ring 13 is a depending flexible sling 18 having its lower end connected to an eye 19 on the rearward end of a stiff wire 20 having a sinker weight 21 near the eye 19. On its lower end the wire 20 has a larger eye 22 which passes freely through holes 22' in the leading edge 11 of the advancer near its lower end. The larger eye 22 may have a smaller eye 23 to which a hook leader 24 may be secured, instead of to a similar small eye 23' secured at the lower end of the leading edge 11, as shown in Figure 1.

The total of the lengths of the stiff wire 20 and flexible sling 18 is the same as the total of the length of the leading edge 11 between the eyes 22 and 10 and the length of the flexible sling 12, so that when the advancer is being forcibly reeled in, these elements can assume the longitudinally-aligned relations shown in Figure 2, and thereby be easily drawn through weeds or through a small ice hole 26.

In use, as shown, for example, in Figure 4, the first action of the advancer is necessarily a forward and obliquely-downward glide through the water 25 produced by the action of gravity upon the advancer as it is passed through the ice hole 26 on the line 14. If the auxiliary sling 15 is unattached in a hole 17 on one side or the other of the advancer, as in Figures 1, 2 and 3, the downward glide will be straightaway, or in line with the line 14. But, with the auxiliary sling 15 attached in a hole 17 on the plane or wing 8, the glide will be forward and toward the left, and with the sling 15 attached in a hole 17 in the wing 9, as shown in Figures 5 and 6, the downward glide will be forward and toward the right, with respect to the direction of the line 14. It is to be noted that the connection of the auxiliary sling 15 does not change the direction of the rise of the advancer produced by a short pull on the line 14, since on such pull the auxiliary line 15 goes slack and does not, therefore, cant the advancer as it does on the downward glide of the advancer.

It will be understood that in advancing the advancer relaxation of the line permits the advancer to glide downwardly in the water in a direction away from the operator of the line 14, that is, the advancer reaches away from the operator, carrying the line 14 with it. Tightening the line 14 by a slight rearward pull arrests the downward glide of the advancer and causes the advancer to move upwardly and the rise of the advancer thus produced is at an angle which is divergent to the angle of glide, such that the advancer in thus rising takes a step away from the operator and will carry the line 14 forwardly if the operator releases the line as the rise of the advancer is in progress. As gravity and water and line friction halt the advancer at the top of its rise, the line still being relaxed, the advancer subsides in a downward glide away from the operator without manipulation of the line 14 by the operator. These short relaxings of and pulls upon the line 14 are alternated until the advancer has reached to the desired distance away from the operator. It will be noted that the advance made on each occasion is the difference between the forward and downward glide angle and the steep upward rise angle of the advancer.

Thus, by alternately tightening and relaxing the line 14 with the auxiliary sling 15 disconnected or connected to one side of the advancer, the advancer is caused to follow a vertically zig-zagging path 27 in the water 25 in a direction away from the ice hole 26 or other operator's station. With sling 15 connected, the advancer will be moved outwardly and around an imaginary circle 28 having the ice hole 26 as a center.

When a fish is hooked on the hook 24 and is to be pulled in, and the line 14 is pulled in, the advancer will be tilted so that it and its slings are in alignment with the line 14, as shown in Figure 3, whereby removal of the advancer through a small hole is facilitated.

I claim:

1. An advancer for advancing a line through a body of liquid in desired directions away from a station, comprising a pair of similar longitudinally-elongated wings, said wings being coextensive and positioned in forwardly convergent planes, said wings being connected together at their converging longitudinal edges to define a leading edge, sling means for connecting the line to said advancer comprising a short flexible sling connected to one end of said leading edge, a relatively long stiff sling connected to the opposite end of said leading edge, and an intermediate length flexible sling connected to and between the free ends of said short and long slings, and connector means at the juncture of the free ends of said short and intermediate slings for connecting said line thereto whereby said advancer normally occupies a forwardly and downwardly tilted position in said body of liquid relative to said line.

2. An advancer for advancing a line through a body of liquid in desired directions relative to a station, comprising a pair of similar longitudinally-elongated wings, said wings being coextensive and positioned in forwardly convergent planes, said wings being connected together at their converging longitudinal edges to define a leading edge, sling means for connecting the line to said advancer comprising a short flexible sling connected to one end of said leading edge, a relatively long stiff sling connected to the opposite end of said leading edge, and an intermediate length flexible sling connected to and between the free ends of said short and long slings, and connector means at the juncture of the free ends of said short and intermediate slings for connecting said line thereto whereby said advancer normally occupies a forwardly and downwardly tilted position in said body of liquid relative to said line, the combined lengths of said intermediate and long slings being equal to the combined lengths of said short sling and the distance between the points of connection along said leading edge of said long and short slings, whereby when said line is reeled in to remove the same from the liquid, said advancer tilts into alignment with said line with said long, short and intermediate slings in longitudinal alignment.

3. An advancer for advancing a line through a body of liquid in desired directions relative to a station, comprising a pair of similar longitudinally-elongated wings, said wings being coextensive and positioned in forwardly convergent planes, said wings being connected together at their converging longitudinal edges to define a leading edge, sling means for connecting the line to said advancer comprising a short flexible sling connected to one end of said leading edge, a relatively long stiff sling connected to the opposite end of said leading edge, and an intermediate length flexible sling connected to and between the free ends of said short and long slings, and connector means at the juncture of the free ends of said short and intermediate slings for connecting said line thereto whereby said advancer normally occupies a forwardly and downwardly tilted position in said body of liquid relative to said line, and an auxiliary sling having one end secured to said connector means, said auxiliary sling having a free end having means for quick detachable connection to the rearward end of either of said wings whereby said advancer is biased in the direction of the wing to which said auxiliary sling is connected so as to produce sinking of said advancer toward a corresponding side of the direction of said line.

4. A line advancer comprising a pair of longitudinally-elongated wings connected together in mutually-divergent side-by-side relation, means for connecting a line to said advancer comprising plural flexible sling means located at the side of said advancer toward which said wings converge and comprising a sling connected to said advancer near one end thereof and intermediate said wings, and a longer sling connected to said advancer near the opposite end thereof and intermediate said wings whereby said advancer normally occupies a forwardly and downwardly tilted position relative to the line wherein said advancer sinks in an oblique forward direction in liquid in which it is immersed when the line is relaxed and rises in an oblique rearward direction when the line is tightened, said longer sling having a sinker remote from the end thereof which is connected to said advancer.

5. A line advancer comprising a pair of longitudinally elongated wings having longitudinal edges connected together to form a leading edge with said wings in rearwardly divergent relation, and means on said leading edge for connecting a fishing line to said advancer, said means comprising connectors at opposite ends of said leading edge, a short sling connected at one end to the upper connector, a longer sling connected at one end to the lower connector, and means connecting the other ends of the slings together and to the fishing line whereby the advancer occupies a forwardly and downwardly tilted position relative to the fishing line as the advancer is pulled forwardly through water.

NOBLE E. PEELER.

REFERENCES CITED

The following references are of record in the file of this patent:

UNITED STATES PATENTS

| Number | Name | Date |
| --- | --- | --- |
| 1,081,837 | Jordan | Dec. 16, 1913 |
| 1,304,983 | Howerton | May 27, 1919 |
| 1,738,617 | Scharrer | Dec. 10, 1929 |
| 2,062,718 | Kallberg | Dec. 1, 1936 |
| 2,394,132 | Zeibig | Feb. 5, 1946 |